(12) United States Patent
Kato et al.

(10) Patent No.: US 8,580,889 B2
(45) Date of Patent: Nov. 12, 2013

(54) ADDITION CURABLE SELF-ADHESIVE SILICONE RUBBER COMPOSITION

(75) Inventors: Nobu Kato, Annaka (JP); Noriyuki Meguriya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/408,416

(22) Filed: Feb. 29, 2012

(65) Prior Publication Data
US 2012/0232219 A1 Sep. 13, 2012

(30) Foreign Application Priority Data

Mar. 7, 2011 (JP) ................................. 2011-049122

(51) Int. Cl.
*C08G 77/20* (2006.01)
*C08K 3/36* (2006.01)
*C08L 83/07* (2006.01)

(52) U.S. Cl.
USPC ............................................ 524/862; 528/31

(58) Field of Classification Search
None
See application file for complete search history.

(56) References Cited

U.S. PATENT DOCUMENTS

| | | | | |
|---|---|---|---|---|
| 4,077,937 A * | 3/1978 | Sato et al. | ...................... | 524/862 |
| 4,834,721 A | 5/1989 | Onohara et al. | | |
| 5,225,511 A * | 7/1993 | Durfee | ............................. | 528/15 |
| 5,232,959 A * | 8/1993 | Togashi et al. | ................. | 523/211 |
| 5,405,896 A * | 4/1995 | Fujiki et al. | .................... | 524/265 |
| 5,438,094 A * | 8/1995 | Fujiki et al. | .................... | 524/730 |
| 5,879,809 A | 3/1999 | Muramatsu et al. | | |
| 5,932,145 A * | 8/1999 | Mitani et al. | .................. | 252/511 |
| 5,989,704 A | 11/1999 | Hashimoto et al. | | |
| 6,734,250 B2 * | 5/2004 | Azechi et al. | ................. | 524/588 |
| 6,743,515 B1 | 6/2004 | Müller et al. | | |
| 7,425,373 B2 * | 9/2008 | Yamakawa et al. | ........... | 428/447 |
| 7,704,607 B2 * | 4/2010 | Hara et al. | ..................... | 428/450 |
| 2002/0132891 A1 | 9/2002 | Azechi et al. | | |
| 2005/0250902 A1 * | 11/2005 | Yamakawa et al. | ........... | 524/861 |
| 2009/0068475 A1 | 3/2009 | Bosshammer | | |
| 2009/0123764 A1 * | 5/2009 | Morita et al. | .................. | 428/446 |
| 2010/0216920 A1 | 8/2010 | Kato et al. | | |

FOREIGN PATENT DOCUMENTS

| | | |
|---|---|---|
| EP | 0 276 790 B1 | 8/1988 |
| EP | 1 106 662 A2 | 6/2001 |
| JP | 63-183843 | 7/1988 |
| JP | 2-34311 | 8/1990 |
| JP | 04-041562 | 2/1992 |
| JP | 08-053661 | 2/1996 |
| JP | 9-165516 | 6/1997 |
| JP | 9-165517 | 6/1997 |
| JP | 2001-200162 | 7/2001 |
| JP | 2008-537967 | 10/2008 |
| JP | 2010-196011 | 9/2010 |
| JP | 2010-242043 | 10/2010 |
| WO | WO 2006/100098 A1 | 9/2006 |

OTHER PUBLICATIONS

Extended European Search Report issued Apr. 19, 2012 in Patent Application No. 12158165.6.
Office Action issued Jul. 2, 2013, in Japanese Patent Application No. 2011-049122.

* cited by examiner

*Primary Examiner* — Robert S Loewe
(74) *Attorney, Agent, or Firm* — Oblon, Spivak, McClelland, Maier & Neustadt, L.L.P.

(57) ABSTRACT

An addition curable self-adhesive silicone rubber composition comprising (A) an organopolysiloxane containing at least two alkenyl groups, (B) an organohydrogenpolysiloxane containing at least three SiH groups, (C) another organohydrogenpolysiloxane containing no other reactive groups than SiH groups, and (F) an addition reaction catalyst, with a SiH/alkenyl molar ratio ranging from 0.8 to 5.0, is briefly moldable and cures to various metals and organic resins.

8 Claims, No Drawings

ADDITION CURABLE SELF-ADHESIVE SILICONE RUBBER COMPOSITION

CROSS-REFERENCE TO RELATED APPLICATION

This non-provisional application claims priority under 35 U.S.C. §119(a) on Patent Application No. 2011-049122 filed in Japan on Mar. 7, 2011, the entire contents of which are hereby incorporated by reference.

TECHNICAL FIELD

This invention relates to an addition curable silicone rubber composition having a self-adhesion ability and more particularly, an addition curable self-adhesive silicone rubber composition which may cure and bond to organic resins such as polyamide, polybutylene terephthalate (PBT), polycarbonate, polyphenylene oxide and polyphenylene sulfide, metals such as iron and aluminum, and various glass materials.

BACKGROUND ART

Since silicone rubber has excellent characteristics including heat resistance, freeze resistance, safety, electric insulation and weather resistance, it finds widespread use in a variety of fields, for example, as automotive parts such as connector seals and spark plug boots, electric/electronic parts such as copier rolls and microwave oven gaskets, and building parts such as sealants, as well as many consumer parts such as nursing nipples and diving gears. In many of these applications, silicone rubber is used as articles combined with metals and organic resins. Many methods were proposed for manufacturing cured products of addition curable silicone rubber compositions integrated with metals and organic resins. Such integrally bonded articles are typically produced by (i) coating the surface of a molded resin with a primer, applying an uncured silicone rubber composition thereto, and curing, (ii) coating an adhesive to an interface, (iii) two-color molding so as to provide mutual engagement, and (iv) curing a self-adhesive silicone rubber composition to a molded resin. However, the use of adhesives or primers adds to the number of steps, and with a certain coating technique, the surface to be bonded may be smeared. The two-color molding method can imposes limitation on the shape of integrated articles and lead to insufficient interfacial adhesion. One solution is a self-adhesive type silicone rubber composition obtained by adding an adhesive to a silicone rubber composition. The self-adhesive type silicone rubber composition eliminates the priming or coating step, shortens the operating time, reduces the cost, and improves the efficiency of operation. It constitutes an effective means for manufacturing integrally molded articles with resins.

In connection with the primerless molding of addition type heat-curable silicone rubber compositions, a number of reports have been made for bonding silicone rubber to organic resins. In one exemplary attempt, self-adhesive silicone rubber compositions are cured on resins. Many proposals were made relating to specific adhesive components for use in the self-adhesive silicone rubber compositions. Also, JP-B H02-034311 discloses to add an organopolysiloxane containing at least 30 mol % of hydrogen atoms directly bonded to silicon atoms to an organic resin so that the resin may become bondable to an addition reaction curable silicone rubber. JP-A S63-183843 discloses the integral adhesion of silicone rubber to an olefin resin having grafted thereto a compound having an aliphatic unsaturated group and a silicon-bonded hydrolyzable group. JP-A H09-165516 and JP-A H09-165517 propose a process in which a thermoplastic resin having added thereto a compound having an aliphatic unsaturated group and a hydrogen atom directly bonded to silicon atom is adhesively joined and integrated with silicone rubber as well as an integrally molded article in which a resin having blended therein a thermoplastic oligomer containing aliphatic unsaturated groups is integrally molded with an oil-bleeding silicone rubber.

However, heat-curable silicone rubber compositions of the addition reaction type fail to achieve through a brief molding step a sufficient bond to general thermoplastic resins including ABS, PC, PE, PP, PBT, PET, acrylic resins, PA, aromatic PA, PPO, PPS, and urethane resins. To acquire a bonding ability, the resins must be modified as suggested in the above patent documents. Modification of resins requires additional steps and an extra cost, and the modified resins sometimes become vulnerable to quality alteration.

Materials known to overcome these problems include self-adhesive, addition-crosslinking silicone rubber compositions comprising an organohydrogenpolysiloxane having a SiH bond and a Si—$C_6H_5$ (phenyl) bond in a molecule (JP-A 2001-200162 and JP-A 2008-537967). In these compositions, however, alkoxysilanes or polyalkoxysiloxanes having a functional group such as epoxy, vinyl or acrylic group must be used as a co-adhesive auxiliary, which requires extra steps and is disadvantageous in economy and work. Since the alkoxysilane moiety is susceptible to hydrolysis, these co-adhesive auxiliaries do not facilitate adhesion unless they react or interact with the rubber base.

CITATION LIST

Patent Document 1: JP-B H02-34311
Patent Document 2: JP-A S63-183843
Patent Document 3: JP-A H09-165516
Patent Document 4: JP-A H09-165517
Patent Document 5: JP-A 2001-200162 (U.S. Pat. No. 6,743,515, EP 1106662)
Patent Document 6: JP-A 2008-537967 (US 20090068475, WO 2006100098)

DISCLOSURE OF INVENTION

An object of the invention is to provide an addition curable self-adhesive silicone rubber composition which is bondable with a wide variety of metals and resins and moldable within a short time, meeting the goal of producing integrally molded articles for use in automotive parts, communication equipment parts and electric/electronic parts by integrally molding silicone rubber compositions with metals or thermoplastic resins.

The inventors have found that when a specific crosslinker is added to an addition curable silicone rubber composition, the resulting composition becomes bondable with a wide variety of materials including metals such as iron, aluminum, copper and stainless steel, and resins such as polycarbonate, polyamide, aromatic polyamide, polybutylene terephthalate (PBT), polyethylene terephthalate (PET), polyphenylene sulfide (PPS), polyphenylene oxide (PPO), polyimide, and polyurethane.

The invention provides an addition curable self-adhesive silicone rubber composition comprising (A) 100 parts by weight of an organopolysiloxane containing at least two silicon-bonded alkenyl groups in a molecule, (B) 0.2 to 30 parts by weight of an organohydrogenpolysiloxane containing at least three silicon-bonded hydrogen atoms (i.e., SiH groups) in a molecule, having the general formula (1):

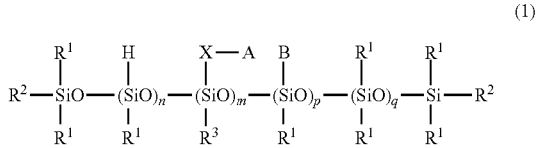

(1)

wherein $R^1$ is each independently an unsubstituted or halo or cyano-substituted monovalent hydrocarbon group of 1 to 5 carbon atoms, $R^2$ is $R^1$ or hydrogen, $R^3$ is $R^1$ or an aromatic ring-containing monovalent organic group of 6 to 10 carbon atoms, X is a single bond or a divalent organic group of 1 to 5 carbon atoms, A is an aromatic ring-containing monovalent organic group of 6 to 10 carbon atoms, B is a monovalent reactive organic group of 3 to 9 carbon atoms, n is a positive number of 3 to 150, m is a positive number of 1 to 30, p is a positive number of 1 to 30, q is a number of 0 to 100, and the sum of n+m+p+q is 10 to 200, (C) 0 to 30 parts by weight of an organohydrogenpolysiloxane containing at least two silicon-bonded hydrogen atoms (i.e., SiH groups) in a molecule and no reactive groups other than the SiH groups, and (F) a catalytic amount of an addition reaction catalyst. A molar ratio of total SiH functional groups in components (B) and (C) to alkenyl groups in component (A) is in a range of from 0.8 to 5.0.

In a preferred embodiment, component (C) is an organohydrogenpolysiloxane having the average compositional formula (II):

$$R^4_c H_d SiO_{(4-c-d)/2}$$ (II)

wherein $R^4$ is an unsubstituted or halo-substituted monovalent hydrocarbon group of 1 to 10 carbon atoms, c is a positive number of 0.7 to 2.1, d is a positive number of 0.001 to 1.0, and the sum of c+d is 0.8 to 3.0. Component (C) is present in an amount of 0.1 to 30 parts by weight per 100 parts by weight of component (A).

In a preferred embodiment, the organohydrogenpolysiloxane as component (B) has a SiH content of 0.006 to 0.015 mol/g.

Preferably, B in formula (1) is at least one monovalent organic group of 3 to 9 carbon atoms having an epoxy ring, alkoxysilyl radical or silanol radical.

The silicone rubber composition may further comprise (D) 5 to 100 parts by weight of a reinforcing silica fine powder and/or (E) 0.5 to 25 parts by weight of an adhesive auxiliary.

In a preferred embodiment, the silicone rubber composition has a 10% cure time T10 of 10 seconds to 60 seconds when measured at 130° C. for 3 minutes and is used in injection molding.

ADVANTAGEOUS EFFECTS OF INVENTION

The addition curable self-adhesive silicone rubber composition cures into a product in a tight bond to a wide variety of metals, organic resins, and glass.

DESCRIPTION OF EMBODIMENTS

Component (A) which is a base polymer in the composition is an organopolysiloxane containing at least two silicon-bonded alkenyl groups in a molecule. Typically one or more organopolysiloxane having the average compositional formula (I) may be used as component (A).

$$R_a SiO_{(4-a)/2}$$ (I)

Herein R is each independently an unsubstituted or substituted monovalent hydrocarbon group of 1 to 10 carbon atoms, preferably 1 to 8 carbon atoms, and "a" is a positive number in the range of 1.5 to 2.8, preferably 1.8 to 2.5, and more preferably 1.95 to 2.05.

Examples of the optionally substituted monovalent $C_1$-$C_{10}$ hydrocarbon groups, represented by R, include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl; and substituted forms of the foregoing groups in which some or all hydrogen atoms are replaced by halogen atoms (e.g., fluoro, bromo and chloro), cyano radicals or the like, such as chloromethyl, chloropropyl, bromoethyl, trifluoropropyl and cyanoethyl. It is preferred that at least 90 mol % of entire R be methyl, and most preferably, all R excluding alkenyl groups be methyl.

At least two of the R groups must be alkenyl groups, preferably of 2 to 8 carbon atoms, more preferably 2 to 6 carbon atoms, and most preferably vinyl. It is noted that the content of alkenyl groups is preferably $1.0 \times 10^{-6}$ mol/g to $5.0 \times 10^{-4}$ mol/g, and more preferably $1.0 \times 10^{-5}$ mol/g to $2.0 \times 10^{-4}$ mol/g of the organopolysiloxane on the average. If the alkenyl content is less than $1.0 \times 10^{-6}$ mol/g, then the rubber may become gel-like due to a too low hardness. If the alkenyl content is more than $5.0 \times 10^{-4}$ mol/g, then the rubber may have a high hardness due to an extremely high crosslinking density. The alkenyl groups may be attached to silicon atoms at ends of the molecular chain and/or silicon atoms midway the molecular chain.

With respect to the structure, the organopolysiloxane generally has a straight chain structure whose backbone is composed of recurring diorganosiloxane units and which is blocked with a triorganosiloxy group at either end of the molecular chain. However, it may have in part a branched or cyclic structure. With respect to the molecular weight, the organopolysiloxane used herein has an average degree of polymerization of up to 1,500, specifically 100 to 1,500, and preferably 150 to 1,000. With an average degree of polymerization of less than 100, no satisfactory rubber feel may be obtainable. With an average degree of polymerization of more than 1,500, the rubber has too high a viscosity to mold. The average degree of polymerization as used herein refers to a weight average degree of polymerization and is generally determined versus polystyrene standards by gel permeation chromatography (GPC) using toluene as solvent.

Component (B) is an organohydrogenpolysiloxane containing at least three, preferably at least four, more preferably at least five silicon-bonded hydrogen atoms (i.e., SiH or hydrosilyl groups) in a molecule. It has the general formula (1).

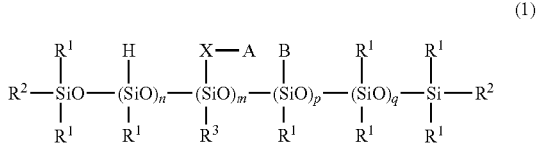

(1)

Herein $R^1$ is each independently an unsubstituted or halo or cyano-substituted monovalent hydrocarbon group of 1 to 5 carbon atoms, $R^2$ is $R^1$ or hydrogen, $R^3$ is $R^1$ or an aromatic ring-containing monovalent organic group of 6 to 10 carbon atoms, X is a single bond or a divalent organic group of 1 to 5 carbon atoms, A is an aromatic ring-containing monovalent organic group of 6 to 10 carbon atoms, B is a monovalent reactive organic group of 3 to 9 carbon atoms, n is a positive number of 3 to 150, m is a positive number of 1 to 30, p is a positive number of 1 to 30, q is a number of 0 to 100, and n+m+p+q is from 10 to 200.

The optionally substituted monovalent $C_1$-$C_5$ hydrocarbon groups, represented by $R^1$, are typically monovalent aliphatic hydrocarbon groups, examples of which include alkyl groups such as methyl, ethyl, propyl, isopropyl, butyl, isobutyl, tert-butyl, pentyl and neopentyl; alkenyl groups such as vinyl, allyl, propenyl, isopropenyl and butenyl; and substituted forms of the foregoing groups in which some or all hydrogen atoms are replaced by halogen atoms (e.g., fluoro, bromo and chloro), cyano radicals or the like, such as chloromethyl, chloropropyl, bromoethyl, trifluoropropyl and cyanoethyl. Preferably aliphatic unsaturated groups such as alkenyl groups are excluded. It is preferred that at least 90 mol % of entire $R^1$ be methyl, and most preferably, all $R^1$ be methyl. $R^2$ is hydrogen or an unsubstituted or halo or cyano-substituted monovalent hydrocarbon group of 1 to 5 carbon atoms represented by $R^1$, examples of which are the same as exemplified just above.

$R^3$ is an unsubstituted or halo or cyano-substituted monovalent hydrocarbon group of 1 to 5 carbon atoms, as represented by $R^1$, or an aromatic ring-containing monovalent organic group of 6 to 10 carbon atoms (for example, an aromatic ring-containing monovalent organic group, typically a monovalent aromatic hydrocarbon group which may contain at least one halogen, hydroxyl, and/or ether bond oxygen atom). Of these, monovalent aliphatic hydrocarbon groups are as exemplified above. Examples of the aromatic ring-containing monovalent organic group include, but are not limited to, aryl and aralkyl groups, groups containing a benzene or naphthalene ring, typically one, for example,

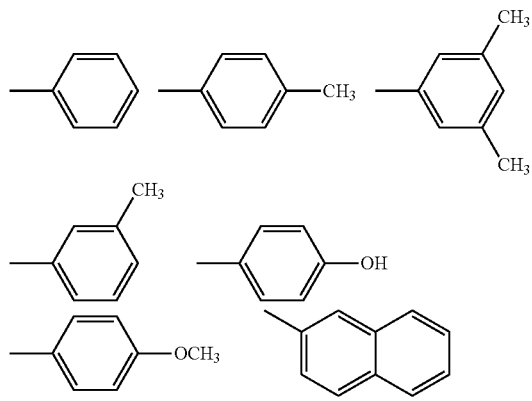

and substituted forms of the foregoing in which at least one hydrogen atom on the aromatic ring is replaced by a halogen atom (e.g., chlorine), hydroxyl, alkyl radical (e.g., methyl), or alkoxy radical (e.g., methoxy). Of the aromatic ring-containing monovalent organic groups, phenyl is most preferred for ease of preparation and cost. $R^3$ is preferably methyl, ethyl, propyl, isopropyl, phenyl or tolyl.

X is a single bond or a divalent organic group of 1 to 5 carbon atoms, which may be a divalent hydrocarbon group consisting of carbon and hydrogen atoms (e.g., straight or branched alkylene) or a divalent linking group optionally containing a heteroatom such as oxygen or nitrogen (e.g., oxyalkylene, iminoalkylene, or ester structure-containing alkylene), or a combination thereof. Suitable organic groups include, but are not limited to, —$CH_2$—$CH_2$—, —$CH_2$—$CH(CH_3)$—, —$(CH_2)_3$—, —$(CH_2)_4$—, —$(CH_2)_5$—, —$CH_2$—$CH(CH_3)$—$CH_2$—, —$CH_2CH_2OCO$—, —$(CH_2)_3$—$OCO$—, —$(CH_2)_3$—$O$—, —$CH_2CH_2OCH_2$—, and —$(CH_2)_3$—$COO$—. Inter alia, —$CH_2$—$CH_2$— and —$CH_2$—$CH(CH_3)$— are most preferred from the standpoints of ease of preparation and cost. X is preferably —$CH_2$—$CH_2$—, —$CH_2$—$CH(CH_3)$— or a single bond.

A is an aromatic ring-containing monovalent organic group of 6 to 10 carbon atoms, as exemplified above for $R^3$. Suitable organic groups include, but are not limited to, aryl and aralkyl groups, groups containing a benzene or naphthalene ring, typically one, for example,

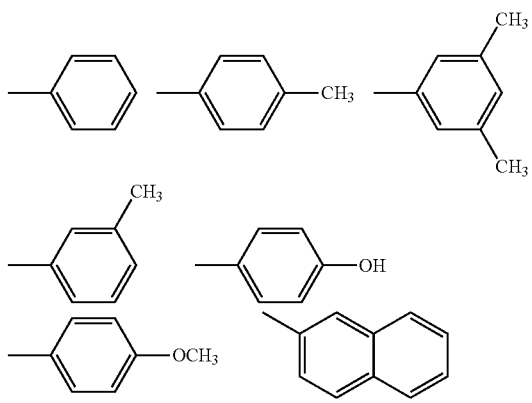

and substituted forms of the foregoing in which at least one hydrogen atom on the aromatic ring is replaced by a halogen atom (e.g., chlorine), hydroxyl, alkyl radical (e.g., methyl), or alkoxy radical (e.g., methoxy). Of these organic groups, phenyl is most preferred from the standpoints of ease of preparation and cost.

B is a monovalent reactive organic group of 3 to 9 carbon atoms. Suitable monovalent organic groups include alkyl groups of 3 to 9 carbon atoms substituted with a reactive radical, for example, groups having an epoxy ring such as glycidyl, glycidoxy, 3,4-epoxycyclohexyl or 2,3-epoxycyclohexyl, typically one, and groups having an alkoxysilyl radical such as trimethoxysilyl, triethoxysilyl or methyldimethoxysilyl or a silanol (i.e., hydroxysilyl) radical, as shown below.

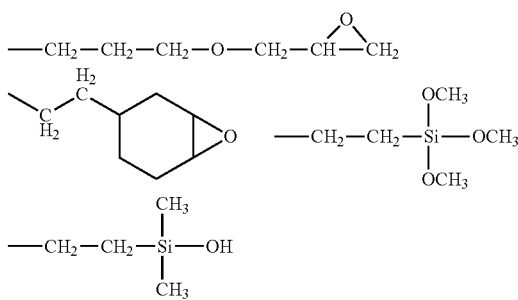

Of these organic groups, glycidyloxypropyl is most preferred for adhesion strength and ease of preparation.

The subscript n is a positive number of 3 to 150, preferably 4 to 150, more preferably 5 to 150, even more preferably 8 to 100, and most preferably 10 to 60. An n value of less than 3 may lead to insufficient crosslinking and low adhesion. With n in excess of 150, an organohydrogenpolysiloxane becomes unstable. The subscript m is a positive number of 1 to 30, preferably 2 to 25, and more preferably 3 to 20. With m of less than 1, good adhesion is not developed. With m in excess of 30, an organohydrogenpolysiloxane may become less compatible with component (A), resulting in insufficient crosslinking. The subscript p is a positive number of 1 to 30, preferably 2 to 25, and more preferably 3 to 20. With p of less than 1, good adhesion is not developed. With p in excess of 30, an organohydrogenpolysiloxane may become unstable. The subscript q is a number of 0 to 100, preferably 0 to 50, more preferably 0 to 30, and even more preferably 0 to 20. With q in excess of 100, adhesion may be compromised. The sum of n+m+p+q is a positive number of 10 to 200, preferably 15 to 150, and more preferably 20 to 100. A sum (n+m+p+q) of less than 10 may lead to substantial steric hindrance and insufficient crosslinking. A sum (n+m+p+q) in excess of 200 may lead to a substantially low cure rate or crosslinking reaction rate.

The organohydrogenpolysiloxane as component (B) contains SiH functional groups preferably in a content of 0.006 to 0.015 mol/g, more preferably 0.007 to 0.014 mol/g. A SiH content of less than 0.006 mol/g or more than 0.015 mol/g may lead to a loss of adhesion.

The organohydrogenpolysiloxane as component (B) may be prepared by utilizing addition reaction of an aromatic ring-containing organohydrogenpolysiloxane with an alkenyl compound having a reactive organic group, or of an organohydrogenpolysiloxane with an alkenyl compound having aromatic ring and an alkenyl compound having a reactive organic group.

Component (B) is blended in an amount of 0.2 to 30 parts, preferably 0.3 to 20 parts, and more preferably 0.5 to 15 parts by weight per 100 parts by weight of component (A). Less than 0.2 pbw of component (B) leads to a loss of adhesion whereas more than 30 pbw of component (B) adversely affects physical properties of cured rubber.

Component (C) is another organohydrogenpolysiloxane which contains no reactive groups other than SiH groups in a molecule. This organohydrogenpolysiloxane (C) does not fall in the scope of component (B) in that component (C) does not contain the reactive group B in component (B). It is an organohydrogenpolysiloxane containing at least two, preferably at least three silicon-bonded hydrogen atoms (i.e., SiH groups) in a molecule and preferably free of an aromatic group, typically phenyl. The organohydrogenpolysiloxane as component (C) contains at least two (specifically 2 to 200), preferably at least three (specifically 3 to 200), more preferably 5 to 100, and even more preferably 8 to 50 silicon-bonded hydrogen atoms (or SiH groups) in a molecule. Preferably it has the average compositional formula (II):

$$R^4{}_c H_d SiO_{(4-c-d)/2} \qquad (II)$$

wherein $R^4$ is an unsubstituted or halo-substituted monovalent hydrocarbon group of 1 to 10 carbon atoms, preferably 1 to 8 carbon atoms, c is a positive number of 0.7 to 2.1, d is a positive number of 0.001 to 1.0, and c+d is from 0.8 to 3.0.

Examples of the unsubstituted or halo-substituted monovalent hydrocarbon group of 1 to 10 carbon atoms, represented by $R^4$, are as exemplified for R in formula (I). Preferably aromatic groups such as aryl and aralkyl groups (typically phenyl) are excluded. The preferred hydrocarbon groups are free of an aliphatic unsaturated bond such as alkenyl. That is, aliphatic saturated hydrocarbon groups are preferred. Specifically, alkyl groups are preferred, with methyl being most preferred. The subscript c is a positive number of 0.7 to 2.1, preferably 0.8 to 2.0; d is a positive number of 0.001 to 1.0, preferably 0.01 to 1.0; and c+d is from 0.8 to 3.0, preferably 1.0 to 2.5.

With respect to the molecular structure, the organohydrogenpolysiloxane as component (C) may have a linear, cyclic, branched or three-dimensional network structure. The number of silicon atoms per molecule or degree of polymerization generally ranges from 2 to 300, preferably 3 to 200, more preferably 10 to 200, and even more preferably 15 to 100. The preferred organohydrogenpolysiloxane used herein has such a number of silicon atoms and is liquid at room temperature (25° C.). The silicon-bonded hydrogen atom may be located at the end and/or an intermediate (or non-terminus) position of the molecular chain.

Exemplary organohydrogenpolysiloxanes as component (C) include, but are not limited to,
1,1,3,3-tetramethyldisiloxane,
1,3,5,7-tetramethylcyclotetrasiloxane,
methylhydrogencyclopolysiloxane,
methylhydrogencyclosiloxane-dimethylsiloxane cyclic copolymers,
tris(dimethylhydrogensiloxy)methylsilane,
trimethylsiloxy-endcapped methylhydrogenpolysiloxane,
trimethylsiloxy-endcapped dimethylsiloxane-methylhydrogen-siloxane copolymers,
dimethylhydrogensiloxy-endcapped dimethylpolysiloxane,
dimethylhydrogensiloxy-endcapped dimethylsiloxane-methylhydrogensiloxane copolymers,
copolymers of $(CH_3)_2HSiO_{1/2}$ and $SiO_{4/2}$ units,
copolymers of $(CH_3)_3SiO_{1/2}$, $(CH_3)_2HSiO_{1/2}$, and $SiO_{4/2}$ units,
copolymers of $(CH_3)_2HSiO_{1/2}$, $SiO_{4/2}$, and $(CH_3)SiO_{3/2}$ units, and
copolymers of $(CH_3)_2HSiO_{1/2}$, $SiO_{4/2}$, and $(CH_3)_2SiO_{2/2}$ units.

As used herein and throughout the disclosure, the term "endcapped" means that a compound is capped at both ends with the indicated group unless otherwise stated.

The organohydrogenpolysiloxane as component (C) should preferably have a content of silicon-bonded hydrogen (SiH groups) of 0.003 to 0.017 mol/g, more preferably 0.005 to 0.017 mol/g. A SiH content of less than 0.003 mol/g may lead to insufficient crosslinking whereas a siloxane with a SiH content in excess of 0.017 mol/g may be unstable.

Blending of the organohydrogenpolysiloxane as component (C) is optional, but favored when cure and rubber physical properties are considerations. The organohydrogenpolysiloxane as component (C) is blended in an amount of 0 to 30 parts, preferably 0.1 to 30 parts, and more preferably 0.3 to 15 parts by weight per 100 parts by weight of component (A). Less than 0.1 pbw of component (C) may lead to insufficient crosslinking so that the rubber may become rather sticky. More than 30 pbw of component (C) detracts from rubber physical properties and is uneconomical.

According to the invention, components (A), (B) and (C) are used in such amounts that a molar ratio of total SiH functional groups in components (B) and (C) to alkenyl groups in component (A), simply referred to as SiH/alkenyl ratio, is in a range of 0.8/1 to 5.0/1, preferably 1.2 to 4.0, and more preferably 1.5 to 3.0. A SiH/alkenyl ratio of less than 0.8 leads to a loss of adhesion whereas a ratio in excess of 5.0 detracts from rubber physical properties.

Component (D) is a reinforcing silica fine powder which may be any of silica species commonly used in the art as a reinforcement for rubber. Although any silica fine powders used in conventional silicone rubber compositions are useful, a reinforcing silica fine powder having a specific surface area of at least 50 m$^2$/g as measured by the BET method is preferred. It is advantageous to use precipitated silica (wet silica), fumed silica (dry silica) and fired silica having a BET specific surface area of 50 to 400 m$^2$/g, with the fumed silica being especially advantageous for improved rubber strength. The reinforcing silica fine powder may be surface treated. In this case, silica particles may be directly treated.

Any of well-known techniques may be used for the surface treatment. For example, an untreated silica fine powder and a surface treating agent are admitted into a mechanical milling device closed under atmospheric pressure or a fluidized bed where they are mixed to effect surface treatment at room temperature or elevated temperature, optionally in the presence of an inert gas. If desired, a catalyst is used to promote the surface treatment. After thorough admixing, the powder is dried, yielding a treated silica fine powder. The amount of the surface treating agent used is at least the theoretical amount calculated from the surface area to be covered with the agent. Suitable treating agents include silazanes such as hexamethyldisilazane and divinyltetramethyldisilazane; silane coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane and chloropropyltrimethoxysilane; and organosilicon compounds such as polymethylsiloxane and organohydrogenpolysiloxane. After surface treatment with such treating agents, the resulting silica fine particles are hydrophobic and ready for use. Of these treating agents, the silane coupling agents and silazanes are preferred.

An appropriate amount of component (D) blended is 0 to 100 parts, preferably 5 to 100 parts, more preferably 5 to 80 parts, and more preferably 10 to 50 parts by weight per 100 parts by weight of component (A). It is acceptable herein to omit component (D), although there may sometimes arise problems such as weak mechanical strength of cured rubber and inconvenience of molding, typically mold release. More than 100 pbw of component (D) is difficult to fill, aggravating working and processing efficiency.

To the silicone rubber composition, (E) an adhesive auxiliary may be added. It may be any of auxiliaries commonly used in addition curable silicone rubber compositions. Preferably the adhesive auxiliary is a compound, typically organosilicon compound, having in a molecule two or more functional groups selected from epoxy, aromatic (e.g., monovalent aryl groups, typically phenyl, or di- to tetravalent arylene groups), silicon-bonded hydrogen (i.e., SiH), isocyanate, alkoxysilyl, alkoxyalkoxysilyl, alkenyl (e.g., vinyl), (meth)acryloyloxy, and silanol groups. It is noted that component (E) excludes components (B) and (C).

Suitable organosilicon compounds include silanes having two or more functional groups (specifically alkoxysilanes having a functional group of alkoxysilyl and one or more other functional groups), and linear or cyclic siloxanes having 2 to 30 silicon atoms, preferably 4 to 20 silicon atoms. Specific examples include organoalkoxysilanes having alkoxysilyl or alkoxyalkoxysilyl as an essential functional group and one or more other functional groups (inclusive of aromatic groups) and straight, branched or cyclic organopolysiloxanes having a SiH group as an essential functional group and one or more other functional groups.

Also included are silicon-free organic compounds having in a molecule 1 to 4, preferably 1 to 2, phenylene or biphenylene groups and at least 1, preferably 2 to 4, alkenyl groups, for example, the ester of benzenedicarboxylic acid having 2 functional groups in a molecule with allyl alcohol and the ester of benzenetetracarboxylic acid having 4 functional groups in a molecule with allyl alcohol. The reaction products of these compounds with SiH-containing siloxane compounds are also useful.

Also included are organosilanes having in a molecule an isocyanate group as an essential functional group and one or more other functional groups, such as alkoxysilyl and silanol groups, and partial hydrolytic condensates thereof (i.e., siloxanes).

Among the compounds exemplified as the adhesive auxiliary, preference is given to organosilicon compounds, typically organosilanes or organopolysiloxanes, having in a molecule a vinyl, (meth)acrylic or epoxy group and at least one group selected from silicon-bonded hydrogen atom, alkoxysilyl and silanol groups, and organosilicon compounds, typically organosilanes or organopolysiloxanes, having in a molecule an isocyanate group and at least one group selected from silicon-bonded hydrogen atom, alkoxysilyl and silanol groups.

Typical of the adhesive auxiliary (E) are the compounds shown below.

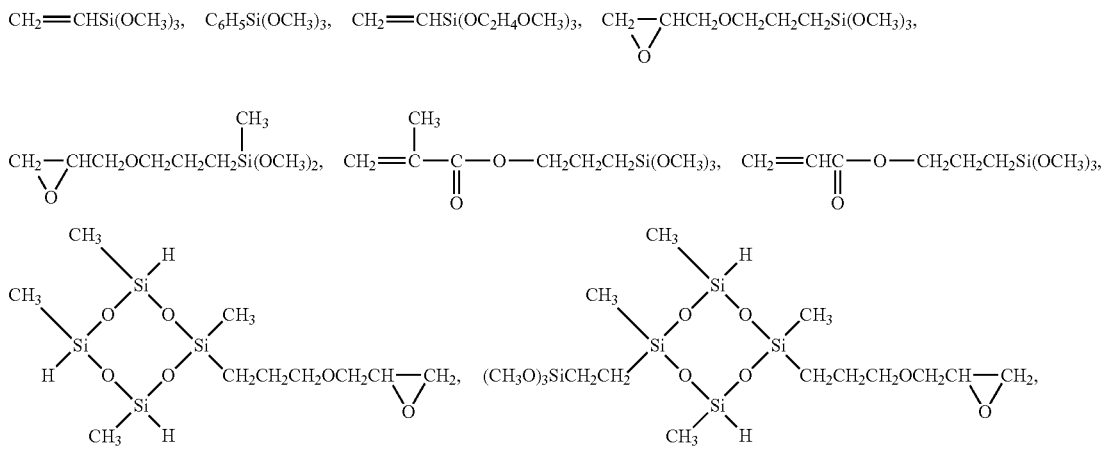

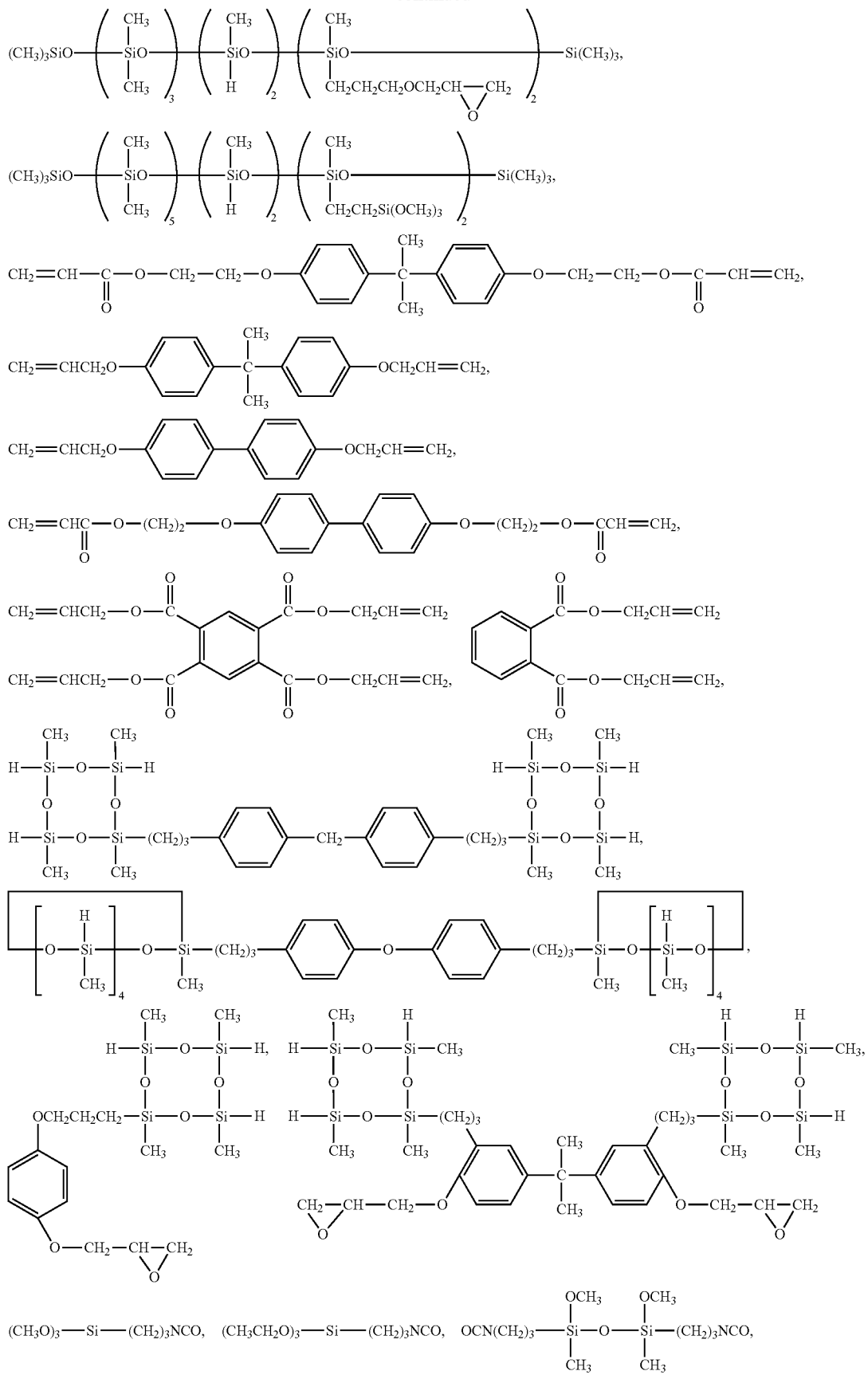

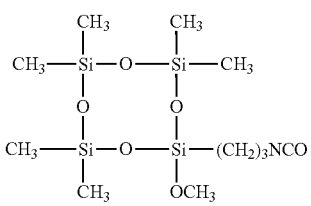

An appropriate amount of component (E) blended is 0 to 25 parts, preferably 0.5 to 25 parts, and more preferably 0.5 to 10 parts by weight per 100 parts by weight of the organopolysiloxane (A). Although addition of component (E) is optional, a bond strength may not develop in the absence of component (E). An excess of component (E) may adversely affect mold release and is uneconomical.

In an embodiment wherein a compound having SiH or alkenyl groups is blended as component (E), a molar ratio of total SiH functional groups to total alkenyl groups in the composition, SiH/alkenyl ratio, is preferably in a range of 0.8 to 5.0, and more preferably 1.2 to 4.0. Outside the range, a lower SiH/alkenyl ratio may lead to a loss of rubber strength and adhesion whereas a higher SiH/alkenyl ratio in excess of 5.0 detracts from rubber physical properties, especially resistance to compression set.

Component (F) is an addition reaction catalyst. Examples include platinum base catalysts such as platinum black, platinic chloride, reaction products of chloroplatinic acid with monohydric alcohols, complexes of chloroplatinic acid with olefins, and platinum bisacetoacetate, palladium catalysts and rhodium catalysts. The catalyst may be added in a catalytic amount, specifically 0.1 to 1,000 ppm, more specifically 1 to 200 ppm of platinum, palladium or rhodium metal based on the weight of the organopolysiloxane (A).

In addition to the above-described components, various additives may be added to the addition curable self-adhesive silicone rubber composition of the invention. Such additives are selected for a particular purpose. Typical additives are metal oxides and compounds thereof such as titanium oxide, iron oxide, cerium oxide, vanadium oxide, cobalt oxide, chromium oxide, and manganese oxide, and inorganic fillers, for example, quartz powder, diatomaceous earth, calcium carbonate, magnesium carbonate, alumina, carbon, hollow glass, hollow resins, conductive inorganic powders of gold, silver and copper, and metallized particle powder. Also, pigments, heat resistance modifiers, flame retardants, plasticizers, and reaction regulators may be added insofar as the desired properties are not impaired. These optional additives may be added in conventional amounts that would not hamper the benefits of the invention.

The silicone rubber composition can be obtained simply by uniformly admixing the above-described components (A) to (F) and optional components at room temperature. In one preferred procedure, component (D) is mixed with all or a portion of component (A) in a planetary mixer or kneader where they are heat treated at a temperature of 100 to 200° C. for 1 to 4 hours. The mixture is cooled to room temperature, whereupon the remaining components are added and mixed.

Any desired molding technique may be selected depending on the viscosity of the mixture or composition. Any of casting, compression molding, dispenser molding, injection molding, extrusion molding, and transfer molding techniques is useful. The composition may be heat molded, typically at a temperature of 60 to 200° C. for 10 seconds to 24 hours.

In molding the addition curable self-adhesive silicone rubber composition, a method capable of taking advantage of its adhesion is preferably used. Preferred is an insert molding method including mounting a member in a mold, placing an uncured composition in contact with the member, and curing the composition to form an integrally molded article. Also preferred is a two-color molding method including alternately injecting a molten or uncured organic resin and the composition into a mold to form an integrally molded article.

In order that the composition be effective in these molding methods, the composition should preferably have a viscosity at 25° C. in the range of 20 to 800 Pa-s, more preferably 50 to 600 Pa-s, and even more preferably 80 to 500 Pa-s at a shear rate of $10 \, s^{-1}$. If the viscosity is less than 20 Pa-s or more than 800 Pa-s, molding may become difficult. Notably, the viscosity is measured by a rotational viscometer.

The cure speed of the composition is not particularly limited as long as the aforementioned molding methods can be implemented. With a focus on molding efficiency, the composition should preferably meet 10 seconds≤T10≤60 seconds, more preferably 15 seconds≤T10≤40 seconds, provided that T10 is a 10% cure time (in sec) when measured at 130° C. for 3 minutes on a cure tester (e.g., rotorless disc rheometer or moving die rheometer (MDR)). If T10 is less than 10 seconds, the composition may cure too fast to mold. A T10 in excess of 60 seconds indicates a prolonged molding cycle which may be uneconomical.

The addition curable self-adhesive silicone rubber composition may find use in many fields as integral articles of silicone rubber integrated with metals or organic resins, for example, parts in precision electronic equipment such as mobile phones, mobile communications equipment, mobile computers, entertainment machines, watches, image receivers, DVD equipment, MD equipment and CD equipment, electric appliances such as microwave ovens, refrigerators, rice cookers, and flat panel displays (e.g., LC and plasma displays), business machines such as copiers, printers and facsimile machines, and automotive parts such as connector seals, ignition plug caps, and sensor parts.

The addition curable self-adhesive silicone rubber composition is bondable to various metals, organic resins, and glass materials. Members with which the composition can be integrated are made of metals such as aluminum, iron, copper, zinc, nickel, stainless steel, brass and the like, or organic resins, typically thermoplastic resins such as olefin polymerization or polycondensation systems. Exemplary resins include acrylonitrile-butadiene-styrene (ABS) resins, polycarbonate (PC) resins, urethane (PU) resins, styrene resins, polyethylene (PE) resins, polypropylene (PP) resins, acrylic resins, polyethylene terephthalate (PET) resins, polybutylene terephthalate (PBT) resins, polyphenylene oxide (PPO) resins, polyphenylene sulfide (PPS) resins, polysulfone resins, nylon (PA) resins, aromatic polyamide (aromatic PA) resins, polyimide (PI) resins, and liquid crystal resins.

The composition may be cured under suitable conditions. In order to acquire strong adhesion between the composition and the metal or thermoplastic resin, the composition must be cured at a temperature for a time such that the resin may not be deformed, melted or altered. Integrally molded articles are obtainable under curing conditions including a temperature of 60 to 220° C. and a time of 5 seconds to 30 minutes, especially 100 to 200° C. and 10 seconds to 10 minutes although the curing conditions vary with the type of resin.

EXAMPLE

Examples of the invention are given below by way of illustration and not by way of limitation. All parts are by weight.

First described is the synthesis of organohydrogenpolysiloxanes as component (B).

Synthesis Example 1

A 500-mL separable flask equipped with a thermometer, reflux condenser, dropping funnel, and mechanical stirrer was charged with 162 g of a compound of the formula:

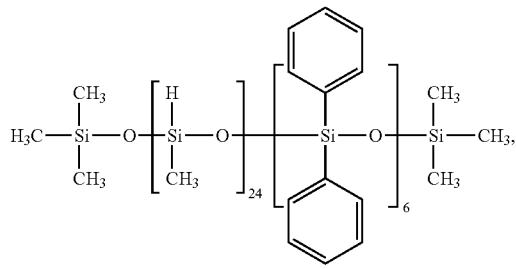

81 g of toluene, 0.22 g of acetonitrile, and 0.21 g of a 0.5 wt % toluene solution of chloroplatinic acid, and heated at 80° C. Then 62 g of allyl glycidyl ether was added dropwise over 30 minutes to the solution, which was stirred for 1 hour at 80° C. to 100° C. Toluene was distilled off in vacuum, yielding 217 g of a compound of the formula below.

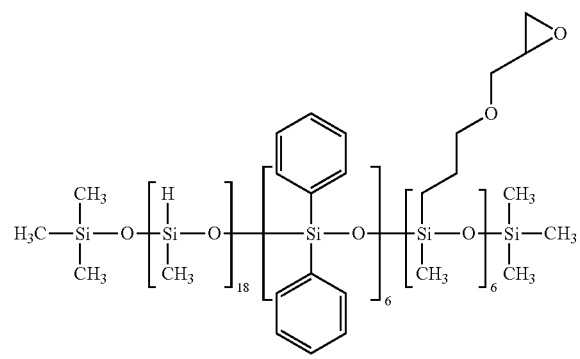

This is designated organohydrogenpolysiloxane A (SiH content 0.00940 mol/g).

Synthesis Example 2

A 500-mL separable flask equipped with a thermometer, reflux condenser, dropping funnel, and mechanical stirrer was charged with 174 g of a compound of the formula:

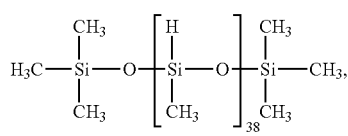

87 g of toluene, and 0.23 g of a 0.5 wt % toluene solution of chloroplatinic acid, and heated at 80° C. In an oxygen-containing nitrogen stream, 35 g of α-methylstyrene was added dropwise over 15 minutes to the solution, which was stirred for 1 hour at 80° C. to 100° C. Acetonitrile, 0.25 g, was added, and 34 g of allyl glycidyl ether was added dropwise over 10 minutes to the solution, which was stirred for 1 hour at 80° C. to 100° C. Toluene was distilled off in vacuum, yielding 231 g of a compound of the formula below.

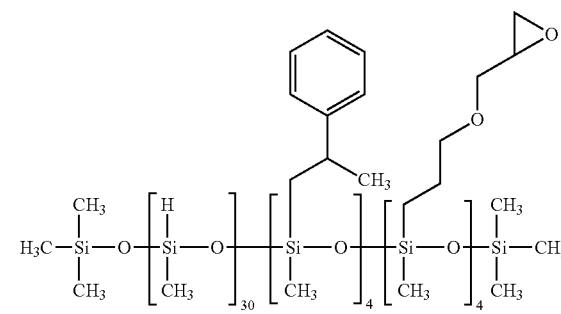

This is designated organohydrogenpolysiloxane B (SiH content 0.0101 mol/g).

Synthesis Example 3

A 500-mL separable flask equipped with a thermometer, reflux condenser, dropping funnel, and mechanical stirrer was charged with 140 g of a compound of the formula:

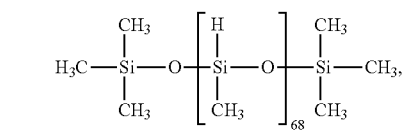

71 g of toluene, and 0.27 g of a 0.5 wt % toluene solution of chloroplatinic acid, and heated at 80° C. In an oxygen-containing nitrogen stream, 55 g of α-methylstyrene was added dropwise over 15 minutes to the solution, which was stirred for 1 hour at 80° C. to 100° C. Then 35 g of trimethoxyvinylsilane was added dropwise over 10 minutes to the solution, which was stirred for 1 hour at 80° C. to 100° C. Toluene was distilled off in vacuum, yielding 223 g of a compound of the formula below.

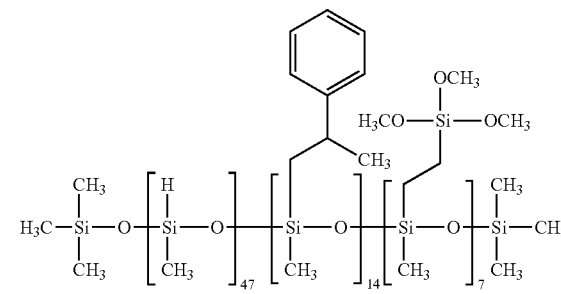

This is designated organohydrogenpolysiloxane C (SiH content 0.00678 mol/g).

Example 1

To 70 parts of a dimethylvinylsiloxy-endcapped dimethylpolysiloxane A having a viscosity of 30,000 mPa-s at 25° C. (degree of polymerization 710, vinyl value 0.000038 mol/g)

were added 40 parts of fumed silica having a BET specific surface area of 300 m²/g and 10 parts of hexamethyldisilazane. The contents were uniformly admixed in a kneader/mixer and further heat admixed at 150° C. for 3 hours, obtaining a silicone rubber base. To the silicone rubber base were added 30 parts of dimethylpolysiloxane A, 10 parts of a trimethylsiloxy-endcapped dimethylpolysiloxane B having vinyl groups on side chains (degree of polymerization 150, vinyl value 0.0014 mol/g) (providing a vinyl value of 0.00016 mol/g as an average of overall component (A) in the composition), 1.6 parts of a trimethylsiloxy-endcapped organohydrogenpolysiloxane E in which all silicon-bonded monovalent hydrocarbon groups other than silicon-bonded oxygen and hydrogen atoms are methyl (i.e., trimethylsiloxy-endcapped dimethylsiloxane-methylhydrogensiloxane copolymer with a degree of polymerization of 11 and a SiH content of 0.013 mol/g), 0.75 part of organohydrogenpolysiloxane A having a SiH content of 0.0094 mol/g (Synthesis Example 1), 0.1 part of 1 wt % chloroplatinic acid in 2-ethylhexanol, and 0.05 part of 50 wt % ethynyl cyclohexanol in ethanol as a reaction regulator. The contents were uniformly admixed for about 30 minutes, yielding a silicone rubber composition. This silicone rubber composition had a molar ratio of total SiH functional groups to total alkenyl groups, that is, SiH/alkenyl ratio of 1.9.

Using a precision rotational viscometer RotoVisco RV1 (Eko Instruments Co., Ltd.), the viscosity of the silicone rubber composition at 25° C. and a shear rate of 10 s⁻¹ was measured to be 450 Pa-s. An ability to cure at 130° C. was measured by a moving die rheometer MDR2000 (Alpha Technologies), finding T10=25 seconds.

The silicone rubber composition was press-cured at 150° C. for 5 minutes and post-cured in an oven at 150° C. for 2 hours into a cured sample, which was measured for hardness, tensile strength and elongation at break according to JIS K6249. The results are shown in Table 1.

In another test, test pieces (~25×50 mm) of aluminum, stainless steel (SUS316L), polyethylene terephthalate (PET), nylon 6 (PA), polyphenylene oxide (PPO), and polyphenylene sulfide (PPS) were mounted in molds. The silicone rubber composition was placed thereon and press-cured at 150° C. for 3 minutes into a rubber layer of 1 to 3 mm thick. From the integrally molded article, the rubber layer was manually peeled. Adhesion was evaluated in terms of cohesive failure (rubber failure rate). The results are shown in Table 2.

Example 2

To 60 parts of a dimethylvinylsiloxy-endcapped dimethylpolysiloxane C having a viscosity of 10,000 mPa-s at 25° C. (degree of polymerization 510, vinyl value 0.000053 mol/g) were added 30 parts of fumed silica having a BET specific surface area of 200 m²/g, 10 parts of precipitated silica having a BET specific surface area of 200 m²/g, 6 parts of hexamethyldisilazane, and 2 parts of water. The contents were uniformly admixed in a kneader/mixer and further heat admixed at 150° C. for 3 hours, obtaining a silicone rubber base. To the silicone rubber base were added 20 parts of a dimethylvinylsiloxy-endcapped dimethylpolysiloxane D having a viscosity of 1,000 mPa-s at 25° C. (degree of polymerization 210, vinyl value 0.00013 mol/g), 10 parts of a dimethylvinylsiloxy-endcapped dimethylpolysiloxane E having vinyl groups on side chains (degree of polymerization 420, vinyl value 0.00065 mol/g) (providing a vinyl value of 0.00014 mol/g as an average of overall component (A) in the composition), 1.0 part of organohydrogenpolysiloxane E (Example 1), 1.85 parts of organohydrogenpolysiloxane B (SiH content 0.0101 mol/g, Synthesis Example 2), 0.1 part of 1 wt % chloroplatinic acid in 2-ethylhexanol, and 0.12 part of 50 wt % ethynyl cyclohexanol in ethanol as a reaction regulator. The contents were uniformly admixed for about 30 minutes, yielding a silicone rubber composition. This silicone rubber composition had a molar ratio of total SiH functional groups to total alkenyl groups, that is, SiH/alkenyl ratio of 2.5.

As in Example 1, the silicone rubber composition was determined for viscosity and cure, finding a viscosity of 520 Pa-s and T10=35 seconds. It was also measured for hardness, tensile strength, elongation at break, and adhesion as in Example 1. The results are shown in Tables 1 and 2.

Example 3

To 70 parts of dimethylpolysiloxane A (used in Example 1) were added 40 parts of fumed silica having a BET specific surface area of 200 m²/g, 5 parts of hexamethyldisilazane, 0.3 part of divinyltetramethyldisilazane, and 2 parts of water. The contents were uniformly admixed in a kneader/mixer and further heat admixed at 150° C. for 3 hours, obtaining a silicone rubber base. To the silicone rubber base, 30 parts of dimethylpolysiloxane D (used in Example 2) (providing a vinyl value of 0.000066 mol/g as an average of overall component (A) in the composition) and 20 parts of diatomaceous earth (Oplite 3005S by Kitaaki Keisodo K.K.) were added and agitated for 30 minutes. To the mixture were added 1.73 parts of organohydrogenpolysiloxane C (SiH content 0.00678 mol/g, Synthesis Example 3), 0.58 part of a compound of the following formula:

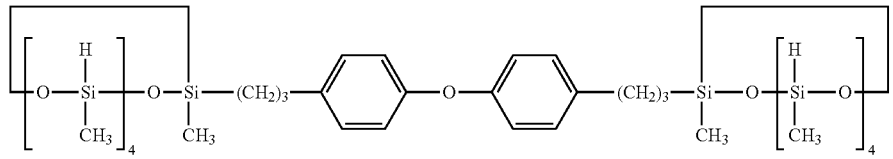

(SiH content 0.0088 mol/g) as an adhesive auxiliary, 0.1 part of 1 wt % chloroplatinic acid in 2-ethylhexanol, and 0.08 part of 50 wt % ethynyl cyclohexanol in ethanol as a reaction regulator. The contents were uniformly admixed for about 30 minutes, yielding a silicone rubber composition. This silicone rubber composition had a molar ratio of total SiH functional groups to total alkenyl groups, that is, SiH/alkenyl ratio of 1.5.

As in Example 1, the silicone rubber composition was determined for viscosity and cure, finding a viscosity of 340 Pa-s and T10=26 seconds. It was also measured for hardness, tensile strength, elongation at break, and adhesion as in Example 1. The results are shown in Tables 1 and 2.

Example 4

To 60 parts of a dimethylvinylsiloxy-endcapped dimethylpolysiloxane F having a viscosity of 50,000 mPa-s at 25° C.

(degree of polymerization 850, vinyl value 0.000032 mol/g) were added 30 parts of surface-hydrophobized fumed silica having a BET specific surface area of 230 m²/g (Reolosil DM30S by Tokuyama Corp.), 5 parts of hexamethyldisilazane, and 2 parts of water. The contents were uniformly admixed in a kneader/mixer and further heat admixed at 150° C. for 3 hours, obtaining a silicone rubber base. To the silicone rubber base were added 20 parts of dimethylpolysiloxane D (used in Example 2), 10 parts of dimethylpolysiloxane E (used in Example 2) (providing a vinyl value of 0.00012 mol/g as an average of overall component (A) in the composition), 0.42 part of organohydrogenpolysiloxane E (used in Example 1), 2.39 parts of organohydrogenpolysiloxane C (SiH content 0.00678 mol/g, Synthesis Example 3), 0.5 part of a compound of the following formula:

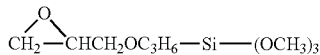

as an adhesive auxiliary, 0.1 part of 1 wt % chloroplatinic acid in 2-ethylhexanol, and 0.08 part of 50 wt % ethynyl cyclohexanol in ethanol as a reaction regulator. The contents were uniformly admixed for about 30 minutes, yielding a silicone rubber composition. This silicone rubber composition had a molar ratio of total SiH functional groups to total alkenyl groups, that is, SiH/alkenyl ratio of 2.0.

As in Example 1, the silicone rubber composition was determined for viscosity and cure, finding a viscosity of 410 Pa-s and T10=25 seconds. It was also measured for hardness, tensile strength, elongation at break, and adhesion as in Example 1. The results are shown in Tables 1 and 2.

Comparative Example 1

To 70 parts of dimethylpolysiloxane A (used in Example 1) were added 40 parts of fumed silica having a BET specific surface area of 300 m²/g and 10 parts of hexamethyldisilazane. The contents were uniformly admixed in a kneader/mixer and further heat admixed at 150° C. for 3 hours, obtaining a silicone rubber base. To the silicone rubber base were added 30 parts of dimethylpolysiloxane A, 10 parts of dimethylpolysiloxane B (used in Example 1), 2.14 parts of organohydrogenpolysiloxane E (used in Example 1), 0.1 part of 1 wt % chloroplatinic acid in 2-ethylhexanol, and 0.05 part of 50 wt % ethynyl cyclohexanol in ethanol as a reaction regulator. The contents were uniformly admixed for about 30 minutes, yielding a silicone rubber composition. This silicone rubber composition had a molar ratio of total SiH functional groups to total alkenyl groups, that is, SiH/alkenyl ratio of 1.9.

As in Example 1, the silicone rubber composition was determined for viscosity and cure, finding a viscosity of 170 Pa-s and T10=22 seconds. It was also measured for hardness, tensile strength, elongation at break, and adhesion as in Example 1. The results are shown in Tables 1 and 2.

Comparative Example 2

To 70 parts of dimethylpolysiloxane A (used in Example 1) were added 40 parts of fumed silica having a BET specific surface area of 300 m²/g and 10 parts of hexamethyldisilazane. The contents were uniformly admixed in a kneader/mixer and further heat admixed at 150° C. for 3 hours, obtaining a silicone rubber base. To the silicone rubber base were added 30 parts of dimethylpolysiloxane A, 10 parts of dimethylpolysiloxane B (used in Example 1), 2.9 parts of a compound of the formula:

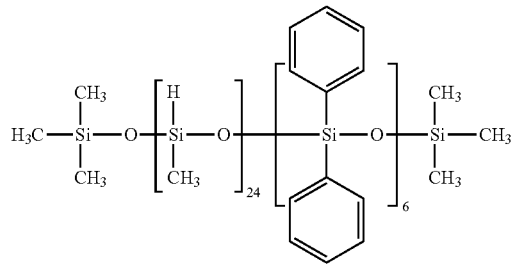

as an adhesive auxiliary, 0.1 part of 1 wt % chloroplatinic acid in 2-ethylhexanol, and 0.05 part of 50 wt % ethynyl cyclohexanol in ethanol as a reaction regulator. The contents were uniformly admixed for about 30 minutes, yielding a silicone rubber composition. This silicone rubber composition had a molar ratio of total SiH functional groups to total alkenyl groups, that is, SiH/alkenyl ratio of 1.9.

As in Example 1, the silicone rubber composition was determined for viscosity and cure, finding a viscosity of 200 Pa-s and T10=27 seconds. It was also measured for hardness, tensile strength, elongation at break, and adhesion as in Example 1. The results are shown in Tables 1 and 2.

Comparative Example 3

To 60 parts of dimethylpolysiloxane C (used in Example 2) were added 30 parts of fumed silica having a BET specific surface area of 200 m²/g, 10 parts of precipitated silica having a BET specific surface area of 200 m²/g, 6 parts of hexamethyldisilazane, and 2 parts of water. The contents were uniformly admixed in a kneader/mixer and further heat admixed at 150° C. for 3 hours, obtaining a silicone rubber base. To the silicone rubber base were added 20 parts of dimethylpolysiloxane D (used in Example 2), 10 parts of dimethylpolysiloxane E (used in Example 2), 3.3 parts of a compound of the formula:

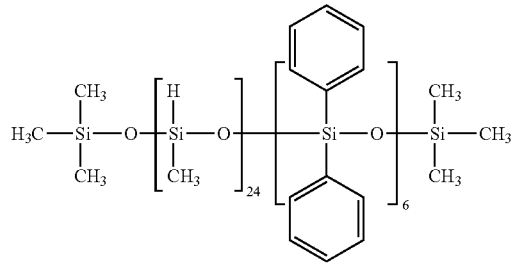

as an adhesive auxiliary, 0.5 part of a compound of the formula:

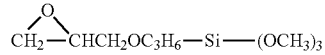

as an adhesive auxiliary, 0.1 part of 1 wt % chloroplatinic acid in 2-ethylhexanol, and 0.12 part of 50 wt % ethynyl cyclohexanol in ethanol as a reaction regulator. The contents were uniformly admixed for about 30 minutes, yielding a silicone rubber composition. This silicone rubber composition had a molar ratio of total SiH functional groups to total alkenyl groups, that is, SiH/alkenyl ratio of 2.5.

As in Example 1, the silicone rubber composition was determined for viscosity and cure, finding a viscosity of 320 Pa-s and T10=35 seconds. It was also measured for hardness, tensile strength, elongation at break, and adhesion as in Example 1. The results are shown in Tables 1 and 2.

Comparative Example 4

To 70 parts of dimethylpolysiloxane A (used in Example 1) were added 40 parts of fumed silica having a BET specific surface area of 200 m²/g, 5 parts of hexamethyldisilazane, 0.3 part of divinyltetramethyldisilazane, and 2 parts of water. The contents were uniformly admixed in a kneader/mixer and further heat admixed at 150° C. for 3 hours, obtaining a silicone rubber base. To the silicone rubber base, 30 parts of dimethylpolysiloxane D (used in Example 2) and 20 parts of diatomaceous earth (Oplite 3005S by Kitaaki Keisodo K.K.) were added and agitated for 30 minutes. To the mixture were added 0.90 part of organohydrogenpolysiloxane E (used in Example 1), 0.58 part of a compound of the following formula:

$$\left[O-\underset{\underset{CH_3}{|}}{\overset{H}{\underset{|}{Si}}}-\right]_4 O-\underset{\underset{CH_3}{|}}{\overset{}{\underset{|}{Si}}}-(CH_2)_3-\phantom{x}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!$$

(SiH content 0.0088 mol/g) as an adhesive auxiliary, 0.1 part of 1 wt % chloroplatinic acid in 2-ethylhexanol, and 0.08 part of 50 wt % ethynyl cyclohexanol in ethanol as a reaction regulator. The contents were uniformly admixed for about 30 minutes, yielding a silicone rubber composition. This silicone rubber composition had a molar ratio of total SiH functional groups to total alkenyl groups, that is, SiH/alkenyl ratio of 1.5.

As in Example 1, the silicone rubber composition was determined for viscosity and cure, finding a viscosity of 210 Pa-s and T10=26 seconds. It was also measured for hardness, tensile strength, elongation at break, and adhesion as in Example 1. The results are shown in Tables 1 and 2.

Comparative Example 5

To 60 parts of dimethylpolysiloxane F (used in Example 4) were added 30 parts of surface-hydrophobized fumed silica having a BET specific surface area of 230 m²/g (Reolosil DM30S by Tokuyama Corp.), 5 parts of hexamethyldisilazane, and 2 parts of water. The contents were uniformly admixed in a kneader/mixer and further heat admixed at 150° C. for 3 hours, obtaining a silicone rubber base. To the silicone rubber base were added 20 parts of dimethylpolysiloxane D (used in Example 2), 10 parts of dimethylpolysiloxane E (used in Example 2), 1.67 parts of organohydrogenpolysiloxane E (used in Example 1), 0.5 part of a compound of the following formula:

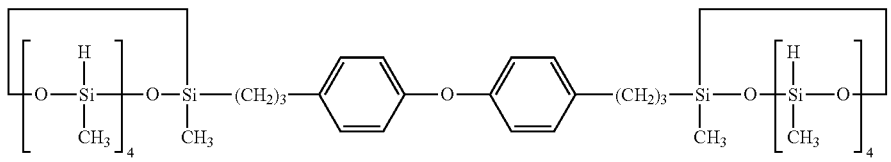

as an adhesive auxiliary, 0.1 part of 1 wt % chloroplatinic acid in 2-ethylhexanol, and 0.08 part of 50 wt % ethynyl cyclohexanol in ethanol as a reaction regulator. The contents were uniformly admixed for about 30 minutes, yielding a silicone rubber composition. This silicone rubber composition had a molar ratio of total SiH functional groups to total alkenyl groups, that is, SiH/alkenyl ratio of 2.0.

As in Example 1, the silicone rubber composition was determined for viscosity and cure, finding a viscosity of 190 Pa-s and T10=25 seconds. It was also measured for hardness, tensile strength, elongation at break, and adhesion as in Example 1. The results are shown in Tables 1 and 2.

TABLE 1

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| Hardness, Durometer type A | 42 | 50 | 39 | 51 | 43 | 42 | 50 | 40 | 51 |
| Tensile strength (MPa) | 8.8 | 9.0 | 8.0 | 8.5 | 9.0 | 8.9 | 9.1 | 8.1 | 8.6 |
| Elongation at break (%) | 700 | 450 | 580 | 460 | 720 | 700 | 520 | 610 | 480 |

TABLE 2

|  | Example | | | | Comparative Example | | | | |
| --- | --- | --- | --- | --- | --- | --- | --- | --- | --- |
| Adhesion | 1 | 2 | 3 | 4 | 1 | 2 | 3 | 4 | 5 |
| Aluminum | ○ | ○ | ○ | ○ | X | ○ | ○ | Δ | ○ |
| Stainless steel | ○ | ○ | ○ | Δ | X | Δ | ○ | ○ | ○ |
| PET | ○ | ○ | ○ | ○ | X | ○ | ○ | ○ | ○ |
| PA | ○ | ○ | ○ | ○ | X | Δ | ○ | ○ | Δ |
| PPO | ○ | ○ | ○ | ○ | X | ○ | ○ | Δ | X/Δ |
| PPS | ○ | ○ | Δ | Δ | X | X/Δ | Δ | X/Δ | X |

Symbols have the following meaning.
○: cohesive failure ≥ 80%
Δ: 30% ≤ cohesive failure < 80%
X/Δ: 0% < cohesive failure < 30%
X : cohesive failure = 0% (peeled)

Japanese Patent Application No. 2011-049122 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An addition curable self-adhesive silicone rubber composition comprising
    (A) 100 parts by weight of an organopolysiloxane containing at least two silicon-bonded alkenyl groups in a molecule,
    (B) 0.2 to 30 parts by weight of an organohydrogenpolysiloxane containing at least eight silicon-bonded hydrogen atoms in a molecule, having the general formula (1):

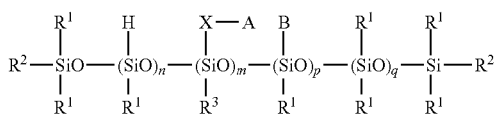

(1)

wherein $R^1$ is each independently an unsubstituted or halo or cyano-substituted monovalent hydrocarbon group of 1 to 5 carbon atoms, $R^2$ is $R^1$ or hydrogen, $R^3$ is $R^1$ or an aromatic ring-containing monovalent organic group of 6 to 10 carbon atoms, X is a single bond or a divalent organic group of 1 to 5 carbon atoms, A is an aromatic ring-containing monovalent organic group of 6 to 10 carbon atoms, B is a monovalent reactive organic group of 3 to 9 carbon atoms, n is a positive number of 8 to 150, m is a positive number of 1 to 30, p is a positive number of 1 to 30, q is a number of 0 to 100, and the sum of n+m+p+q is 10 to 200,
    (C) 0 to 30 parts by weight of an organohydrogenpolysiloxane containing at least two silicon-bonded hydrogen atoms in a molecule and no reactive groups other than the SiH groups, and
    (F) a catalytic amount of an addition reaction catalyst,
    a molar ratio of total SiH functional groups in components (B) and (C) to alkenyl groups in component (A) being in a range of from 0.8 to 5.0.

2. The silicone rubber composition of claim 1 wherein component (C) is an organohydrogenpolysiloxane having the average compositional formula (II):

$$R^4{}_c H_d SiO_{(4-c-d)/2} \qquad \text{(II)}$$

wherein $R^4$ is an unsubstituted or halo-substituted monovalent hydrocarbon group of 1 to 10 carbon atoms, c is a positive number of 0.7 to 2.1, d is a positive number of 0.001 to 1.0, and the sum of c+d is 0.8 to 3.0,
    component (C) being present in an amount of 0.1 to 30 parts by weight per 100 parts by weight of component (A).

3. The silicone rubber composition of claim 1 wherein the organohydrogenpolysiloxane as component (B) has a SiH content of 0.006 to 0.015 mol/g.

4. The silicone rubber composition of claim 1 wherein in formula (1), B is at least one monovalent organic group of 3 to 9 carbon atoms having an epoxy ring, alkoxysilyl radical or silanol radical.

5. The silicone rubber composition of claim 1, further comprising (D) 5 to 100 parts by weight of a reinforcing silica fine powder.

6. The silicone rubber composition of claim 1, further comprising (E) 0.5 to 25 parts by weight of an adhesive auxiliary.

7. The silicone rubber composition of claim 1 which has a 10% cure time T10 of 10 seconds to 60 seconds when measured at 130° C. for 3 minutes on a rotorless disc rheometer or a moving die rheometer as a cure tester.

8. The silicone rubber composition of claim 1, wherein in formula (1), p is a positive number of 3 to 30.

* * * * *